United States Patent
Nagamatsu (12)

(10) Patent No.: US 11,037,553 B2
(45) Date of Patent: Jun. 15, 2021

(54) LEARNING-TYPE INTERACTIVE DEVICE

(71) Applicant: HITACHI, LTD., Tokyo (JP)

(72) Inventor: Kenji Nagamatsu, Tokyo (JP)

(73) Assignee: HITACHI, LTD., Tokyo (JP)

( * ) Notice: Subject to any disclaimer, the term of this patent is extended or adjusted under 35 U.S.C. 154(b) by 164 days.

(21) Appl. No.: 16/037,566

(22) Filed: Jul. 17, 2018

(65) Prior Publication Data

US 2019/0080687 A1 Mar. 14, 2019

(30) Foreign Application Priority Data

Sep. 13, 2017 (JP) .............................. JP2017-175850

(51) Int. Cl.
| | |
|---|---|
| *G10L 15/18* | (2013.01) |
| *G10L 15/22* | (2006.01) |
| *G06F 16/332* | (2019.01) |
| *G06F 40/35* | (2020.01) |
| *G10L 15/30* | (2013.01) |
| *G10L 15/26* | (2006.01) |

(52) U.S. Cl.
CPC ...... *G10L 15/1815* (2013.01); *G06F 16/3329* (2019.01); *G06F 40/35* (2020.01); *G10L 15/22* (2013.01); *G10L 15/26* (2013.01); *G10L 15/30* (2013.01); *G10L 2015/223* (2013.01)

(58) Field of Classification Search
CPC .......................... G10L 15/22; G10L 2015/223
See application file for complete search history.

(56) References Cited

U.S. PATENT DOCUMENTS

| | | | | |
|---|---|---|---|---|
| 9,971,774 | B2* | 5/2018 | Badaskar | ................ G10L 15/26 |
| 9,972,304 | B2* | 5/2018 | Paulik | ................... G10L 15/063 |
| 2004/0006483 | A1 | 1/2004 | Sasaki et al. | |
| 2005/0105712 | A1* | 5/2005 | Williams | .............. G10L 13/027 |
| | | | | 379/265.02 |
| 2020/0074993 | A1* | 3/2020 | Lee | ..................... G10L 15/1822 |

FOREIGN PATENT DOCUMENTS

JP 2004-109323 A 4/2004

* cited by examiner

*Primary Examiner* — Matthew H Baker
(74) *Attorney, Agent, or Firm* — Baker Botts L.L.P.

(57) ABSTRACT

The invention is directed to a learning-type interactive device which performs voice dialogue with a user and accumulates a result of the voice dialogue as knowledge including: a voice recognition portion which performs voice recognition on an acquired uttered voice of the user and converts the voice into text; an intention understanding portion which analyzes an utterance intention from the text voice-recognized by the voice recognition portion with reference to intention understanding model data learned from intention understanding learning data; an answer generation portion which refers to a QA DB and generates an answer text from the utterance intention analyzed by the intention understanding portion, a knowledge extraction portion which extracts knowledge from the text voice-recognized by the voice recognition portion, the utterance intention, and the answer text, and a knowledge classification portion which classifies the knowledge extracted by the knowledge extraction portion according to characteristics.

9 Claims, 11 Drawing Sheets

FIG. 2

INTENTION UNDERSTANDING MODEL DATA   109

| TEXT | COMMAND | CERTAINTY FACTOR |
|---|---|---|
| Mt. TAKAO | QUESTION-ANSWERING (HEIGHT OF Mt. TAKAO) | 0.3 |
| Mt. TAKAO, HEIGHT | QUESTION-ANSWERING (HEIGHT OF Mt. TAKAO) | 0.7 |
| Mt. TAKAO, HEIGHT (HOW MANY METERS OR HIGH) | QUESTION-ANSWERING (HEIGHT OF Mt. TAKAO) | 0.9 |
| Mt. TAKAO, Mt. FUJI | QUESTION-ANSWERING (HEIGHT OF Mt. TAKAO) | 0.5 |
| Mt. TAKAO, HEIGHT, HOW HIGH | QUESTION-ANSWERING (HEIGHT OF Mt. TAKAO) | 0.95 |
| Mt. FUJI, HEIGHT | QUESTION-ANSWERING (HEIGHT OF Mt. FUJI) | 0.7 |

INTENTION UNDERSTANDING LEARNING DATA (GENERAL)   121

| TEXT (121a) | COMMAND (121b) |
|---|---|
| WHAT IS THE HEIGHT OF Mt. TAKAO | QUESTION-ANSWERING (HEIGHT OF Mt. TAKAO) |
| HOW HIGH IS Mt. TAKAO? | QUESTION-ANSWERING (HEIGHT OF Mt. TAKAO) |
| WHAT IS THE HEIGHT DIFFERENCE BETWEEN Mt. TAKAO AND Mt. FUJI? | QUESTION-ANSWERING (HEIGHT OF Mt. TAKAO) |
| Mt. TAKAO IS HIGH, ISN,T IT? | QUESTION-ANSWERING (HEIGHT OF Mt. TAKAO) |

FIG. 4

QA DB (GENERAL)  111

| I | A |
|---|---|
| TELL ME THE HEIGHT OF Mt. TAKAO | IT IS 599 METERS |
| TELL ME THE LOCATION OF Mt. TAKAO | IT IS HACHIOJI CITY, TOKYO |
| TELL ME THE HEIGHT OF Mt. FUJI | IT IS 3,776.12 METERS |
| TELL ME THE LOCATION OF Mt. FUJI | IT IS FUJINOMIYA CITY SHIZUOKA PREFECTURE, AND FUJIYOSHIDA CITY YAMANASHI PREFECTURE |
| TELL ME THE LAST ERUPTION OF Mt. FUJI | IT IS HOEI'S GREAT ERUPTION |

111a — 111b

LEARNING-TYPE INTERACTIVE DEVICE

CROSS REFERENCE TO PRIOR APPLICATIONS

This application claims benefit of priority to Japanese Patent Application No. 2017-175850, filed on Sep. 13, 2017. The content of the above application is hereby incorporated by reference.

TECHNICAL FIELD

The present invention relates to a learning-type interactive device, and more particularly to a learning-type interactive device suitable for acquiring knowledge information for automatically performing voice dialogue.

BACKGROUND ART

A system (hereinafter referred to as an interactive system) has been developed in which a computer or a robot and a human user interact with each other by voice. A robot equipped with the interactive system or a device (hereinafter referred to as an "interactive device") such as a smartphone or a tablet PC operates an interactive system and performs a voice dialogue service to a user facing the robot or the device.

In the interactive system, first, the voice uttered by a user is collected by a microphone and voice recognition is performed. Next, by a process called intention understanding on a transcribed text, it is determined what the user wants the interactive system to do. Finally, based on the result of the determination, the interactive device executes an action intended by the user, for example, an action such as reading an answer to an inquiry or displaying information, or moving if it is a robot.

In the interactive system, when the user makes a question that the system does not know the answer, in the related art, the interactive system answers "I do not know". However, conversely, the system asks a user to answer the question and, as a result, the knowledge of question-answering can be updated. JP-A-2004-109323 discloses the configuration of such a dialogue system. In a voice interactive device of JP-A-2004-109323, when a user asks what the device does not know, the user is asked back the answer and the question contents and the answer are stored and used for the next dialogue. Therefore, the necessity of interrupting the dialogue or changing the topic presented by a user due to unknown dialogue content is reduced and, by learning, it is possible to increase the new scenario and vocabulary to improve knowledge and to reflect it on a dialogue with a user from the next time.

Similarly, in an interactive system, there is also a system configuration which learns the expression used in a question used by a user, not the answer content itself of the question, and updates the knowledge so as to correspond to the question expression with a larger variation.

SUMMARY OF INVENTION

Technical Problem

In an interactive system of the related art, knowledge obtained by performing inverse questioning and the like as described above is commonly used in all succeeding voice dialogue with a user and all contexts by the system. However, the newly learned answer knowledge can be categorized into knowledge which can always be used, knowledge which only a specific interactive device can use, knowledge which can be shared among interactive devices that have a specific role, and the like. Similarly, knowledge on variations of question expressions can also be categorized into knowledge which can always be used, knowledge (or especially effective knowledge for a specific user) which can be used only for a specific user, knowledge which can be used in a specific context of a dialog scenario, and the like.

In an interactive system of the related art, based on the characteristics of such knowledge, it is not taken into consideration to switch on what kind of case the system can use the acquired knowledge. Therefore, there is a problem in that the accuracy of the dialogue is lowered by using answer knowledge on personal information of a certain user for other users, learning question expression knowledge used by only a specific user, and the like.

The present invention is to provide a learning-type interactive device capable of improving the accuracy of dialogue by appropriately classifying acquired knowledge based on characteristics of the knowledge and using it for the dialogue in an interactive system learning using voice.

Solution to Problem

The configuration of a learning-type interactive device of the invention is preferably a learning-type interactive device which performs voice dialogue with a user and accumulates a result of the voice dialogue as knowledge, and includes a voice recognition portion which performs voice recognition on an acquired uttered voice of the user and converts the voice into text, an intention understanding portion which analyzes an utterance intention from the text voice-recognized by the voice recognition portion with reference to intention understanding model data learned from intention understanding learning data, an answer generation portion which refers to a QA DB and generates an answer text from the utterance intention analyzed by the intention understanding portion, a knowledge extraction portion which extracts knowledge from the text voice-recognized by the voice recognition portion, the utterance intention, and the answer text, and a knowledge classification portion which classifies the knowledge extracted by the knowledge extraction portion according to characteristics.

Advantageous Effects of Invention

According to the invention, it is possible to provide a learning-type interactive device capable of improving the accuracy of dialogue by appropriately classifying acquired knowledge based on characteristics of the knowledge and using it for the dialogue in an interactive system learning using voice.

BRIEF DESCRIPTION OF DRAWINGS

FIG. 2 is a table illustrating an example of intention understanding model data;

FIG. 3 is a table illustrating an example of intention understanding learning data;

FIG. 4 is a table illustrating an example of a QA DB;

DESCRIPTION OF EMBODIMENTS

Hereinafter, embodiments of the invention will be described with reference to FIGS. 1 to 11.

First Embodiment

Hereinafter, a first embodiment of the invention will be described with reference to FIGS. 1 to 8.

First, the configuration of a learning-type interactive device according to the first embodiment will be described with reference to FIG. 1.

Figure 1:
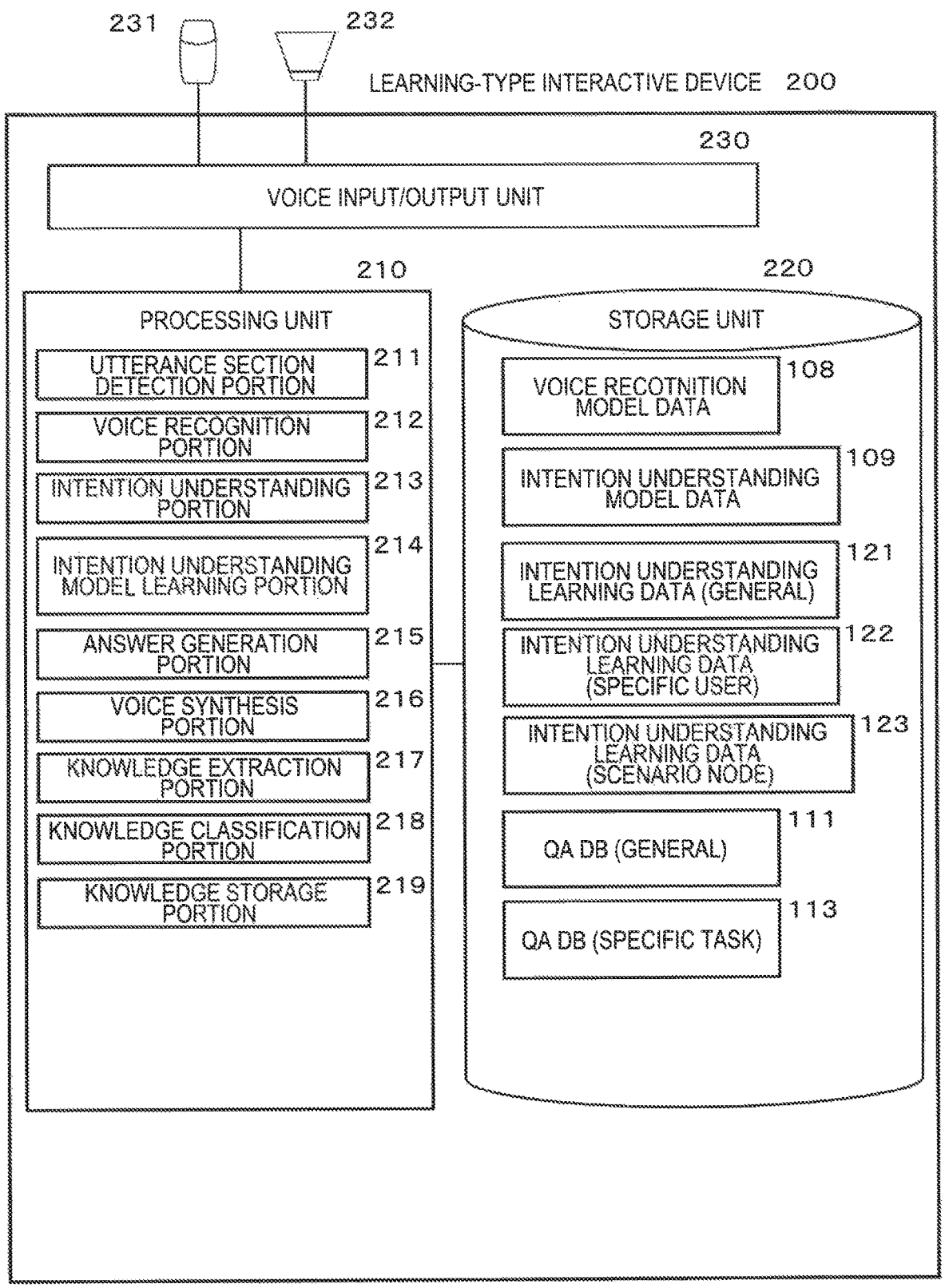
FIG. 1 is a diagram illustrating a functional configuration of a learning-type interactive device according to a first embodiment.

As illustrated in FIG. 1, a learning-type interactive device 200 according to the embodiment is constituted of a processing unit 210, a storage unit 220, and a voice input/output unit 230. The learning-type interactive device 200 may be a general information processing device such as a PC or a smartphone or a robot for performing a specific task.

A microphone 231 and a speaker 232 are connected to the voice input/output unit 230. The voice of a user is inputted from the microphone 231 and voice is output from the speaker 232 to a user.

The processing unit 210 is a unit for executing each process of the learning-type interactive device 200 and constituted of subcomponents of an utterance section detection portion 211, a voice recognition portion 212, an intention understanding portion 213, an intention understanding model learning portion 214, an answer generation portion 215, a voice synthesis portion 216, a knowledge extraction portion 217, a knowledge classification portion 218, and a knowledge storage portion 219.

The function of the subcomponents of the processing unit 210 is executed by a central processing unit (CPU) as hardware by executing a program in a main storage unit.

The utterance section detection portion 211 is a functional portion for detecting a silent portion from user voice and detecting an utterance period. The voice recognition portion 212 is a functional portion for voice recognition of the user voice and converting the voice into text. The intention understanding portion 213 is a functional portion which makes a user's utterance intention meaning from the voice-recognized text. The intention understanding model learning portion 214 is a functional portion which generates intention understanding model data (described below) from intention understanding learning data (described below). The answer generation portion 215 is a functional portion for generating data for response of the learning-type interactive device 200 based on a process of the intention understanding portion 213. The voice synthesis portion 216 is a functional portion for generating voice data for the learning-type interactive device 200 to respond to a user. The knowledge extraction portion 217 is a functional portion which acquires knowledge information based on the process of the answer generation portion 215. The knowledge classification portion 218 is a functional portion which determines a storage location of the knowledge information extracted by the knowledge extraction portion 217. The knowledge storage portion 219 is a functional portion for storing the knowledge information in QA DB (described below) and intention understanding learning data (described below).

The storage unit 220 is a portion for storing necessary data for executing each process of the learning-type interactive device 200 and stores various data of voice recognition model data 108, intention understanding model data 109, intention understanding learning data (general) 121, intention understanding learning data (specific user) 122, intention understanding learning data (scenario node) 123, QA DB (general) 111, and QA DB (specific task) 113.

The voice recognition model data 108 is reference data for voice recognition constituted of probability values for converting acoustic data into phonemes and identifying word connections. The intention understanding model data 109 is reference data for extracting an intention from the recognized text. The intention understanding learning data is learning data to connect the recognized text with the user's utterance intention. In the intention understanding learning data of the embodiment, three-type learning data of the intention understanding learning data (general) 121, the intention understanding learning data (specific user) 122, and the intention understanding learning data (scenario node) 123 are assumed. The details of the intention understanding learning data will be described below.

The Question and Answer DataBase (QA DB) is data which connects the user's utterance intention and the answer to respond. In the QA DB of the embodiment, two kinds of DBs, QA DB (general) 111 and QA DB (specific task) 113, are assumed.

Next, with reference to FIGS. 2 to 4, the main data structure used for the learning-type interactive device of the embodiment will be described.

The intention understanding model data 109 is reference data for extracting an intention from the recognized text, and as illustrated in FIG. 2, it is constituted of fields of a text 109a, a command 109b, and a certainty factor 109c.

The text 109a is a field for storing a word string of the text obtained from the intention understanding learning data. The command 109b is a field for storing a command for the learning-type interactive device to operate. The certainty factor 109c is a field for storing the probability in which the possibility of the learning-type interactive device corresponding to the command described in the command 109b is quantified between 0 and 1 when the word of the text 109a comes out in dialogue with the user.

For example, in the example illustrated in the third record of FIG. 2, when the words "Mt. Takao", "height", "how many meters", or "high" appear in the dialogue with the user, as a response to the question, it shows that the certainty factor of answering the height of Mt. Takao is 0.9.

Intention understanding learning data (general) 121 is original data for learning the intention from the recognized text and creating the intention understanding model data 109 and constituted of fields of a text 121a and a command 121b as illustrated in FIG. 3.

The text 121a is a field for storing text transcribed by voice recognition of the dialogue with a user. The command 121b is a field for storing a command for the learning-type interactive device to operate, which corresponds to the text 121a. In the example illustrated in FIG. 3, as the question-answering, the command 121b indicates that the text corresponding to answering "the height of Mt. Takao" is "what is the height of Mt. Takao?", "how high is Mt. Takao?", "what is the height difference between Mt. Takao and Mt. Fuji?", and the like.

Although not illustrated in the drawing, the intention understanding learning data (specific user) 122 is learning data existing separately for each specific user and is empty when knowledge acquisition for the user is not performed.

Furthermore, although not shown as an illustration, the intention understanding learning data (scenario node) 123 is learning data existing for each specific scenario tree. In this case, the scenario tree is a tree representing the correspondence in the dialog of the learning-type interactive device and the scenario node is a node representing the corresponding finite state of the dialogue device. The learning-type interactive device is designed to transition the node according to the scenario tree by input of dialogue from a user and to respond to the user interaction.

The QA DB (general) 111 is data for storing the answer according to the contents of question-answering and it is constituted of an I field 111a and an A field 111b, as illustrated in FIG. 4.

The I field 111a is a field for storing an intention label representing a question. In this case, the intention label is an identifier representing the intention of the question, such as "height of Mt. Takao", "location of Mt. Takao", and the like. The A field 111b is afield for storing an answer to the intention of the question of the I field 111a. In an example illustrated in FIG. 4, it shows that "599 meters" is stored as the answer to the question intention "height of Mt. Takao" and "Hachioji City, Tokyo" is stored as the answer to the question intention "location of Mt. Takao".

In addition, the QA DB (specific task) 113 is created for each specific task and stores the answer according to the contents of the question-answering regarding the specific task. A specific task refers to a motion with respect to a command received by the learning-type interactive device with respect to a dialog response.

Next, processes of the learning-type interactive device will be described with reference to FIGS. 5 to 8.

First, with reference to FIG. 5, a flow of voice dialogue processes through the learning-type interactive device (interactive device), in particular, a flow of a series of processes until the learning-type interactive device utters a reply speech for the question speech uttered by a user will be described.

The learning-type interactive device always keeps collecting voice with the microphone 231 illustrated in FIG. 1. Under this circumstance, user uttered voice 101 uttered by a user is converted into a digital signal by the microphone, and then utterance section detection process 102 cuts out only the voice portion of the user. Next, a voice recognition process is performed by a voice recognition process 103 and it is transcribed into text corresponding to the voice. In this case, the voice recognition process 103 uses the voice recognition model data 108.

Next, an intention label of a user question is determined based on the word information included in the text by the intention understanding process 104. Here, as described above, the intention label is an identifier representing the intention of the question, such as "height of Mt. Takao", "location of Mt. Takao", and the like. The intention understanding model data 109 is used to determine this intention information from the word information. Next, in answer generation process 105, within the two types of QA DB, the intention label of the I field determined by the intention understanding process 104 is searched and the answer text stored in the corresponding A field is outputted. Finally, the voice synthesis process 106 converts the answer text into synthesized speech and speaks as an answer voice 107 from the interactive device through a speaker 232.

The intention understanding model data 109 is model data which is machine-learned from learning data combining the intention understanding learning data (general) 121 and the intention understanding learning data (specific user) 122 by an intention understanding model learning process 110. In this case, the intention understanding learning data (specific user) 122 is data which exists separately for each user and the contents thereof are empty when knowledge acquisition for a user is not performed. When the interactive device detects a new user and starts a spoken dialogue service, the user is identified using face recognition, biometric information authentication technology, or the like, and if it is a known user, the intention understanding learning data (specific user) 122 for the user is selected, and then the machine learning process described above is performed.

If it is an unknown user, empty data is prepared and the data is newly added to the system as the intention understanding learning data (specific user) 122 for the user. In this way, in a situation where the interactive device serves a certain user, the intention understanding model data 109 is subjected to intention-understanding-model learning specialized for the user.

The intention understanding learning data (specific scenario) 123 is data which exists separately for each scenario tree, and if knowledge acquisition for the scenario is not performed, the contents thereof become empty.

As described above, there are two types of QA DB, the QA DB (general) 111 and the QA DB (specific task) 113. The QA DB (general) 111 is a DB which stores answer information which can be used by any user, any task, and any interactive device. The QA DB (specific task) 113 is a DB which stores answer information which can be answered by only the interactive device executing a specific task.

As described above, these QA DBs are basically a table having two fields of I field and A field. A predefined intention label is stored in the I field and an answer text for a question meaning the intention label is stored in the A field. Also, the QA DB (specific task) 113 and the QA DB (specific device) 114 are DBs existing for each of a plurality of tasks and a plurality of interactive devices. As similar to the case of a user, the QA DB (specific task) and the QA DB (specific device) are switched each time a task or an interactive device changes.

As described above, in the learning-type interactive device of the embodiment, a concept called a task is adopted. The task is information indicating the contents of the service being executed by the interactive device and, for example, "customer guide task", "product explanation task", and the like are conceivable. In each learning-type interactive device, one task is assigned at a given time and service is performed with contents corresponding to the task. Of course, when the task is switched, it is possible to improve the accuracy of dialogue by switching the entirety of three types of intention understanding learning data and two types of QA DB to those for the task.

Based on information such as the answer text output from the answer generation process 105, the transcribed text of the voice recognition process 103, the intention label and the certainty factor of the intention understanding process 104 and, the search result (success/failure) of the QA DB in the answer generation process 105, new knowledge information is extracted in a knowledge extraction process 118. The knowledge information output in this case is three pieces of information, a transcribed text Q, an intention label I, and an answer text A.

The knowledge extraction process 118 can adopt the following procedure, for example.

(When the Certainty Factor of the Intention Label is Low)

When the certainty factor of the intention label is equal to or less than a certain threshold value T1, in the answer generation process 105, answer text can be searched, but reading of the answer text is not carried out. Then, in the knowledge extraction process 118, an answer text is obtained by performing an inverse question to a user. In this case, it is assumed that a user is different from the user who has asked the question and is an entity from whom knowledge can be acquired. For example, when the transcribed text is "Tell me the height of Mt. Takao", the interactive system performs a routine end-of-sentence expression conversion process on this text and asks a user to "Please tell me the height of Mt. Takao".

When the user answers "The height is 599 meters", the voice recognition process is performed, and then text processing such as deleting a routine end-of-sentence expression is performed to obtain a text "599 meters". Furthermore, the interactive system adds its own end-of-sentence representation to obtain the answer text "It is 599 meters". As a result, it is possible to output the extracted knowledge that the transcribed text Q "Tell me the height of Mt. Takao", the newly created intention label I "Tell me the height of Mt. Takao" and the corresponding answer text A "It is 599 meters". The intention label to be newly created must be unique which does not match the already existing label. In the above example, the transcribed text Q is used as it is as a label, but if the same intention label exists, it is easy to make it unique, for example by assigning an identification number to the end.

(When the Intention Label is not Included in the QA Database)

When the intention label specified when the QA database is retrieved in the answer generation process 105 does not exist in the I field, in the similar way as described above, the interactive system makes an inverse question to obtain answer text. As a result, it is possible to output three pieces of information, the transcribed text Q, the intention label I, and the answer text A.

(When the Certainty Factor of the Intention Label is High and it is also Included in the QA DB)

When the certainty factor of the intention label is higher than the threshold value T1 and also it is included in the QA DB, the knowledge extraction process 118 is not executed and only the reading of the answer text retrieved by the answer generation process 105 is performed.

When the knowledge extraction process 118 is executed and the above three pieces of knowledge information are output, they are input to a knowledge classification process 120. In the knowledge classification process 120, it decides which intention understanding learning data and which QA database stores this knowledge information.

Finally, based on the determination result of the knowledge classification process 120, the knowledge storage process 124 stores the extracted knowledge information (Q, I, A) in an appropriate place. That is, the transcribed text Q is stored in the text field of the intention understanding learning data, the intention label I is stored in the command field of the intention understanding learning data and the I field of the QA DB, and the reply text A is stored in the A field of the I field of the QA DB in a predetermined format.

Next, the details of the knowledge classification process 120 will be described with reference to FIG. 6.

First, based on the input knowledge information, it is searched whether the combination of the intention label I and the answer text A is stored in the I field and the A field of one of the QA DBs (S201). When such a record is searched (S201: Y), this knowledge information is determined not to extract new answer knowledge, but to be an extraction result of new expression knowledge. In this case, subsequently, the transcribed text Q, that is, a scenario context dependence degree C. of the question expression of the text is calculated (S202) (details will be described below).

Further, an individual dependence degree U of Q is calculated (S203) (details will be described below). Then, by comparing the magnitude of the scenario context dependence degree C. and the individual dependence degree U with certain threshold values C0 and U0 in (S204, S205), the location of the intention understanding learning data at which the knowledge information (expression information) should be stored is determined. That is, when the scenario context dependence degree C. is larger than the threshold value C0 (S204: Y), it is stored in the intention understanding learning data (scenario node) 123 and, when the scenario context dependence degree C. is not larger than the threshold value C0 (S204: N), the process proceeds to S205. When the individual dependence degree U is larger than the threshold value U0 (S205: Y), it is stored in the intention understanding learning data (specific user) 122 and, when the individual dependence degree U is not larger than the threshold value U0 (S205: N), it is stored in the intention understanding learning data (general) 121.

On the other hand, when no record is retrieved in a process S201 (S201: N), the extracted knowledge information is determined as an answer knowledge. In this case, a task context dependence degree T of the answer text A is calculated (S207) (details will be described below), and then the storage location is classified as the QA DB (general) 111 or the QA DB (specific task) 113 by comparison with a certain threshold value T0. That is, when the task context dependence degree T is larger than the threshold value T0 (S208: Y), the acquired answer knowledge (I, A) is stored in the QA DB (specific task) 113 and, when the task context dependence degree T is not larger than the threshold value T0 (S208: N), it is stored in the QA DB (general) 111.

Next, the answer knowledge is stored in either QA DB, and then the process proceeds to S202. Then, the knowledge information is stored in one of the intention understanding learning data.

In this case, the scenario context dependence degree C. and the individual dependence degree U are calculated by analyzing the transcribed text Q and the task context dependence degree T is calculated by analyzing the answer text A. This is presumed to be that the wording and expression of the question often depends on the scenario in the learning-type interactive device and the individual's way of saying. However, the answer to the question depends on the task given to the learning-type interactive device (for example, in product description tasks, product names, product characteristics, and the likes will often be answers) and it is presumed that it does not depend much on the characteristics of the scenario and the individual.

Next, a scenario context dependence degree C. calculation process and an individual dependence degree U calculation process will be described in detail with reference to FIG. 7.

The scenario context dependence degree C. of the transcribed text Q is calculated as follows. First, the transcribed text Q is divided into words using a morpheme analysis program or the like (S301). Next, referring to the dictionary, by deleting words of a specific part of speech such as a particle, it is possible to extract meaningful content word $w_i$ (S302). Similarly, word segmentation is performed from the text included in the scenario data (S303) and the column $c_k$ of the content word is extracted (S304).

Next, a word string $r_k$ having the same length as the word string $c_k$ is randomly generated from the dictionary (S306). Then, referring to the word co-occurrence probability database 307, from the word $w_i$ and the word strings $c_k$, $r_k$, the co-occurrence probability $\Pr(w_i, w_j|c_k)$ and $\Pr(w_i, w_j|r_k)$ among all the words included in the words $w_i$ conditioned by the word strings $c_k$ and $r_k$ is acquired (S305). The co-occurrence probability $\Pr(w_i, w_j|c_k)$ is a statistical probability that both the word $w_i$ and the word $w_j$ appear in a sentence including the word string $c_k$. The co-occurrence probability $\Pr(w_i, w_j|r_k)$ is a statistical probability that both the word $w_i$ and the word $w_j$ appear in a sentence including the word string $r_k$. Finally, the scenario context dependence degree C. is calculated, for example, by the following (Formula 1). A logarithm takes a natural logarithm.

[Expression 1]

$$C = \frac{1}{N}\sum_{i,j} \log \Pr(w_i, w_j | c_k) - \frac{1}{N}\sum_{i,j} \log \Pr(w_i, w_j | r_k) \quad \text{(Formula 1)}$$

In this case, when the scenario context dependence degree C. is large, it means that the degree of the transcription text Q depends on the scenario (that is, the divergence is larger than that of the random word string).

The task context dependence degree T can also be realized by the same processing. In this case, the answer text A and task data are input and the finally calculated value is set to the task context dependence degree T. Here, the task data is text included in the entire service scenario included in a certain task. In this case, the output of a content word extraction S304 is set to $t_k$ and the value of the task context dependence degree T is calculated by the following (Formula 2).

[Expression 2]

$$T = \frac{1}{N}\sum_{i,j} \log \Pr(w_i, w_j | t_k) - \frac{1}{N}\sum_{i,j} \log \Pr(w_i, w_j | r_k) \quad \text{(Formula 2)}$$

Figure 8:
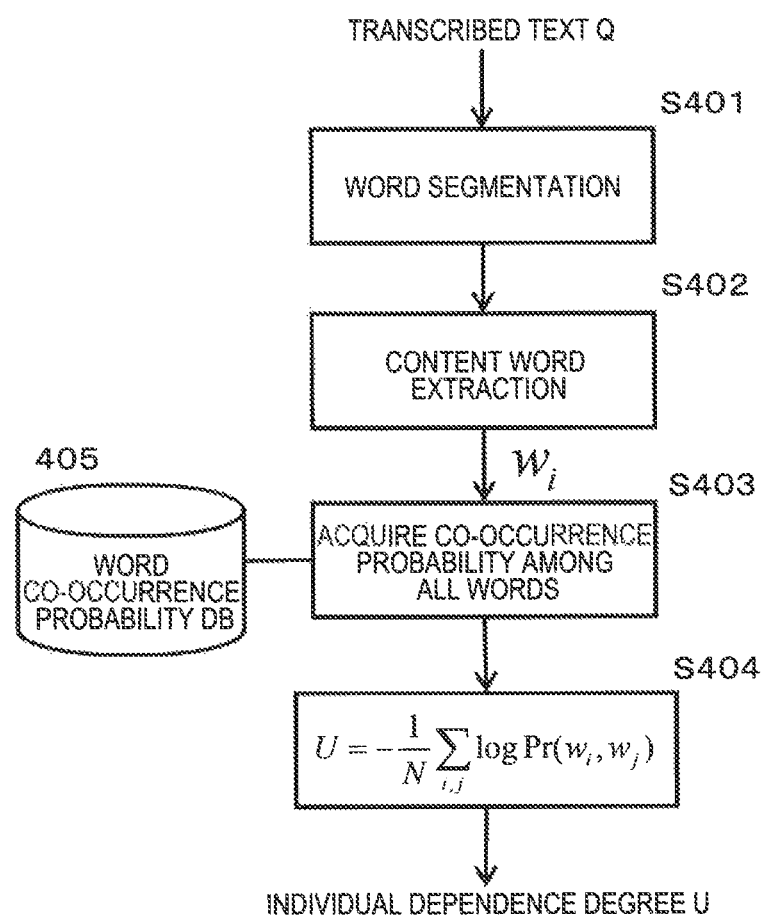
FIG. 8 is a flowchart illustrating a calculation process of an individuality dependence degree.

Next, an individual dependence degree U calculation process will be described with reference to FIG. 8.

Figure 7:
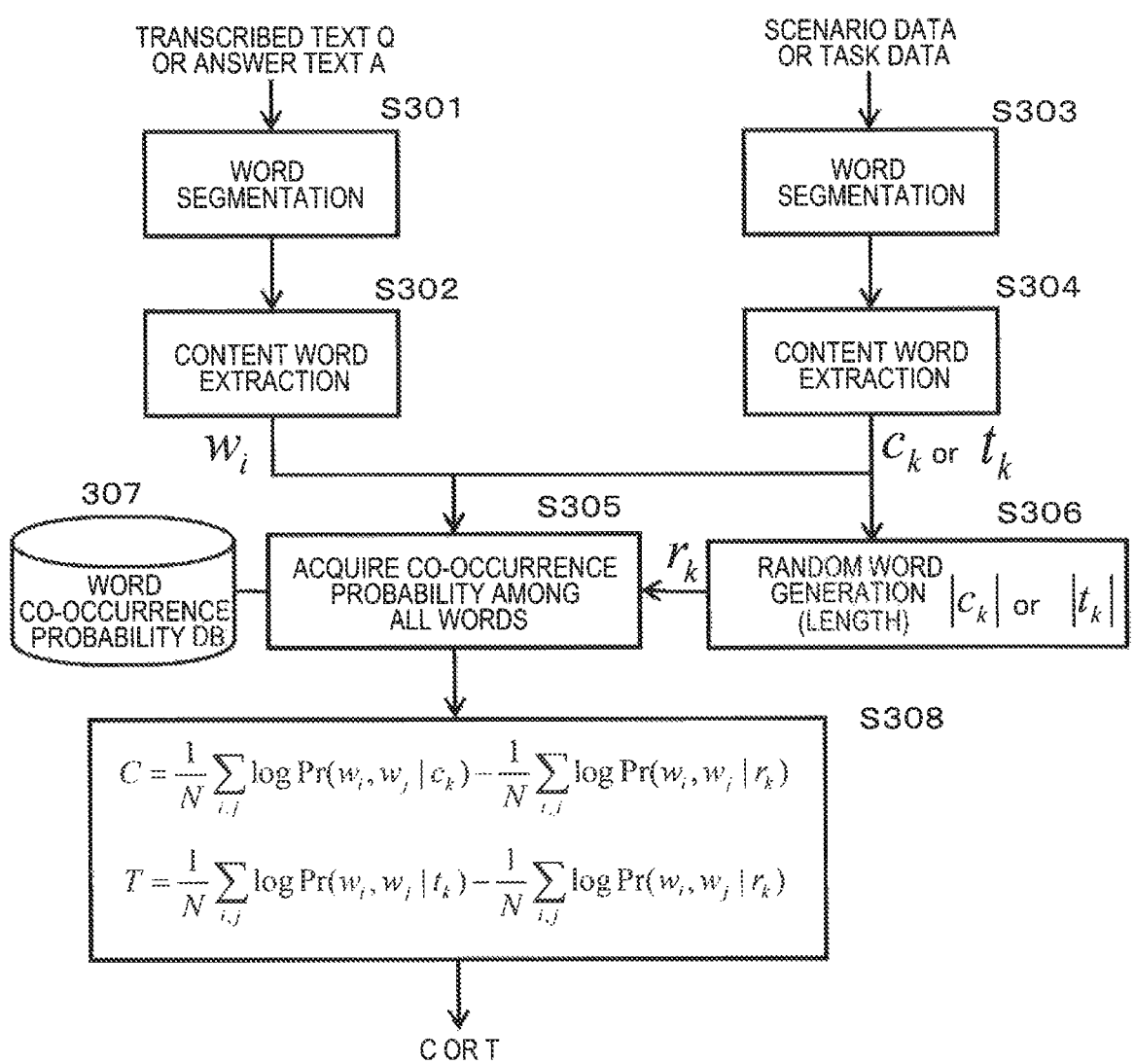
FIG. 7 is a flowchart illustrating a calculation process of a scenario context dependence degree and a task context dependence degree.

First, similarly to the processes illustrated in FIG. 7, the transcribed text Q is divided into words (S401) and a content word is extracted (S402), and then the content word is converted into words $w_i$. Next, in a process S403, by referring to a word co-occurrence probability database 405, co-occurrence probability $\Pr(w_i, w_j)$ between all the words included in the words $w_i$ is acquired (S403). Finally, the individual dependence degree U is calculated by the following (Formula 3).

[Expression 3]

$$U = -\frac{1}{N}\sum_{i,j} \log \Pr(w_i, w_j) \quad \text{(Formula 3)}$$

In this case, when the individual dependence degree U is large, it means that the degree of dependence of the transcribed text Q on the specific user is large. That is, when making a way of not commonly used (combination representation of words with low probability), it means that it is regarded as depending on a specific user.

In the embodiment, as the intention understanding learning data, three types of a general, a specific user, and a scenario node are distinguished by storing them in different locations. However, A type of the intention understanding learning data may be determined by attaching a label to the data and reading the label. Also, as the QA DB, two types of a general and a specific task are distinguished by storing them in different locations, but A type of the QA DB may be determined by attaching a label to the data and reading the label.

In a knowledge storage determination process, the location of the intention understanding learning data and the QA DB at which the acquired knowledge is inserted is determined based on various indicators such as a scenario context dependence degree, an individual dependence degree, and a task context dependence degree. However, a display device and an input device are provided in the learning-type interactive device and the acquired knowledge information (Q, I, A) and the determination based on the indicator is displayed, and further, an administrator checks which intention understanding learning data, QA DB the knowledge information is to be put in.

As described above, according to the configuration of the embodiment, the learning-type interactive device can store the knowledge on the newly obtained question-answering or knowledge on the query expression in the intention understanding model data or the QA DB properly classified according to its characteristics. As a result, knowledge which can be answered only to a specific user will not be answered to other users. In addition, it solves the problem of lowering the dialog accuracy by using the question expression knowledge effective for a specific user to other users. The same applies to the specific task.

In addition, by storing knowledge about question expression according to the scenario of learning-type interactive device as intention understanding model data, accuracy of learning can be improved.

Second Embodiment

Figure 9:
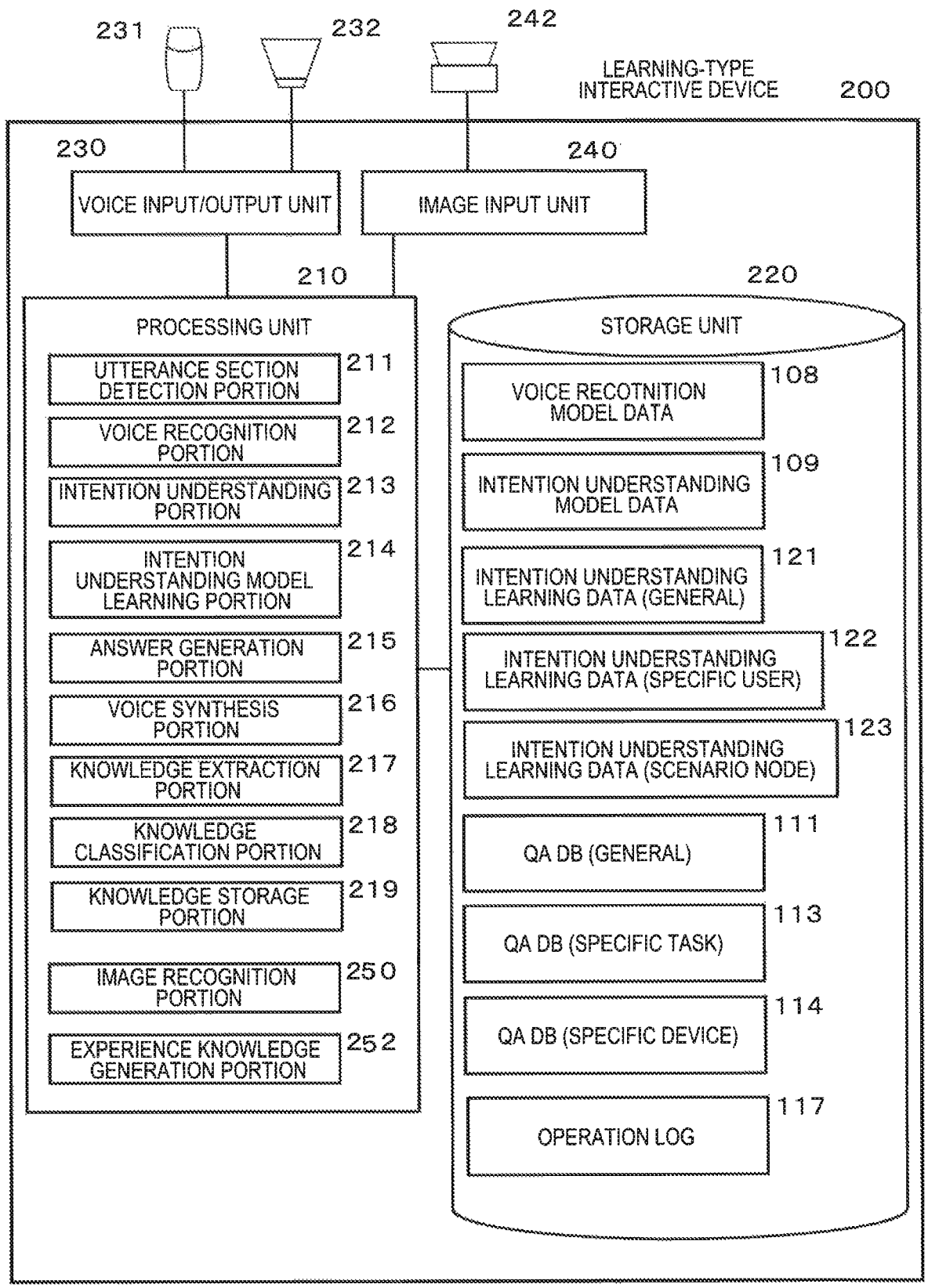
FIG. 9 is a diagram illustrating a functional configuration of a learning-type interactive device according to a second embodiment.
Figure 10:
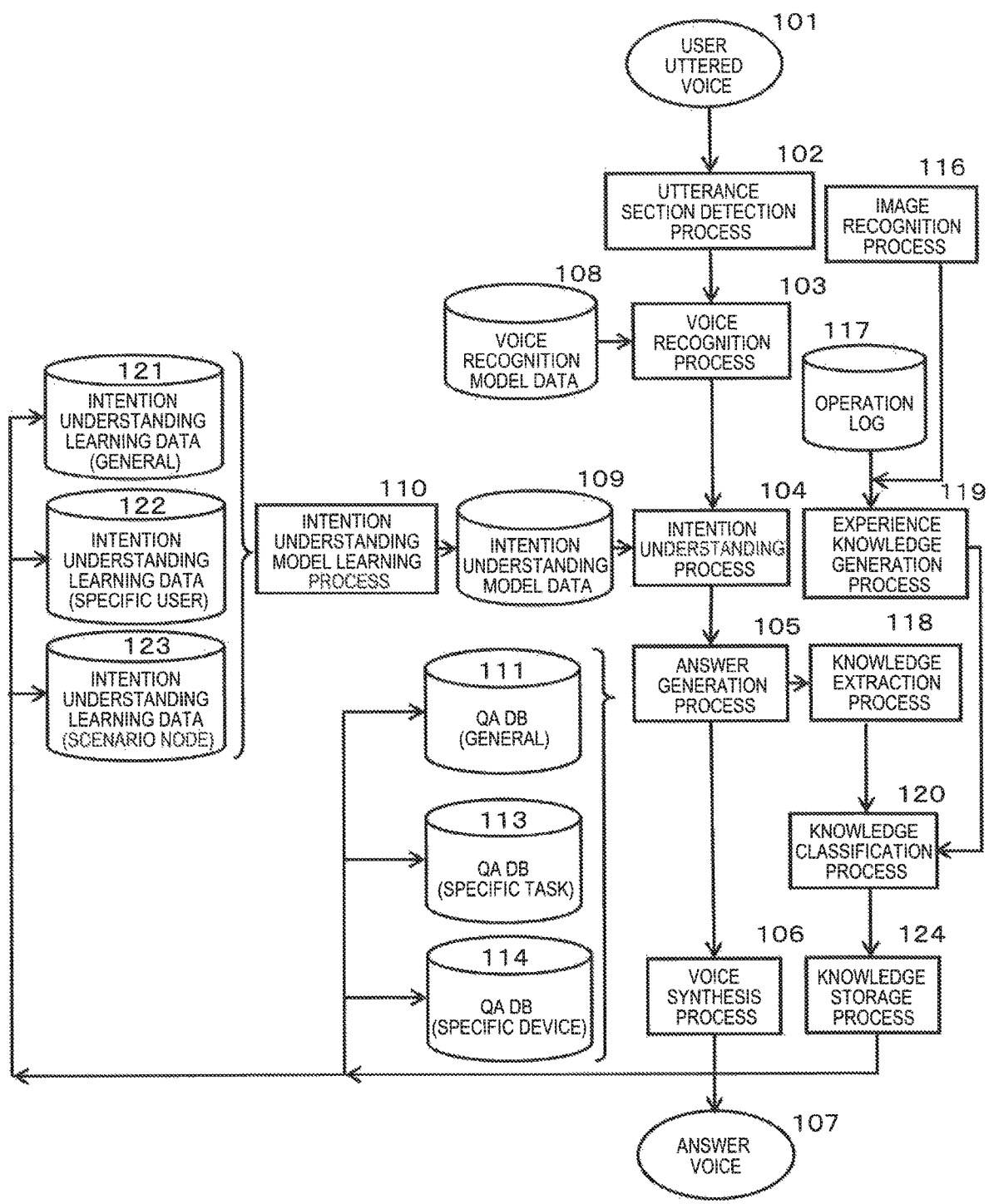
FIG. 10 is a flowchart illustrating a flow of a process of the learning-type interactive device according to the second embodiment.
Figure 11:
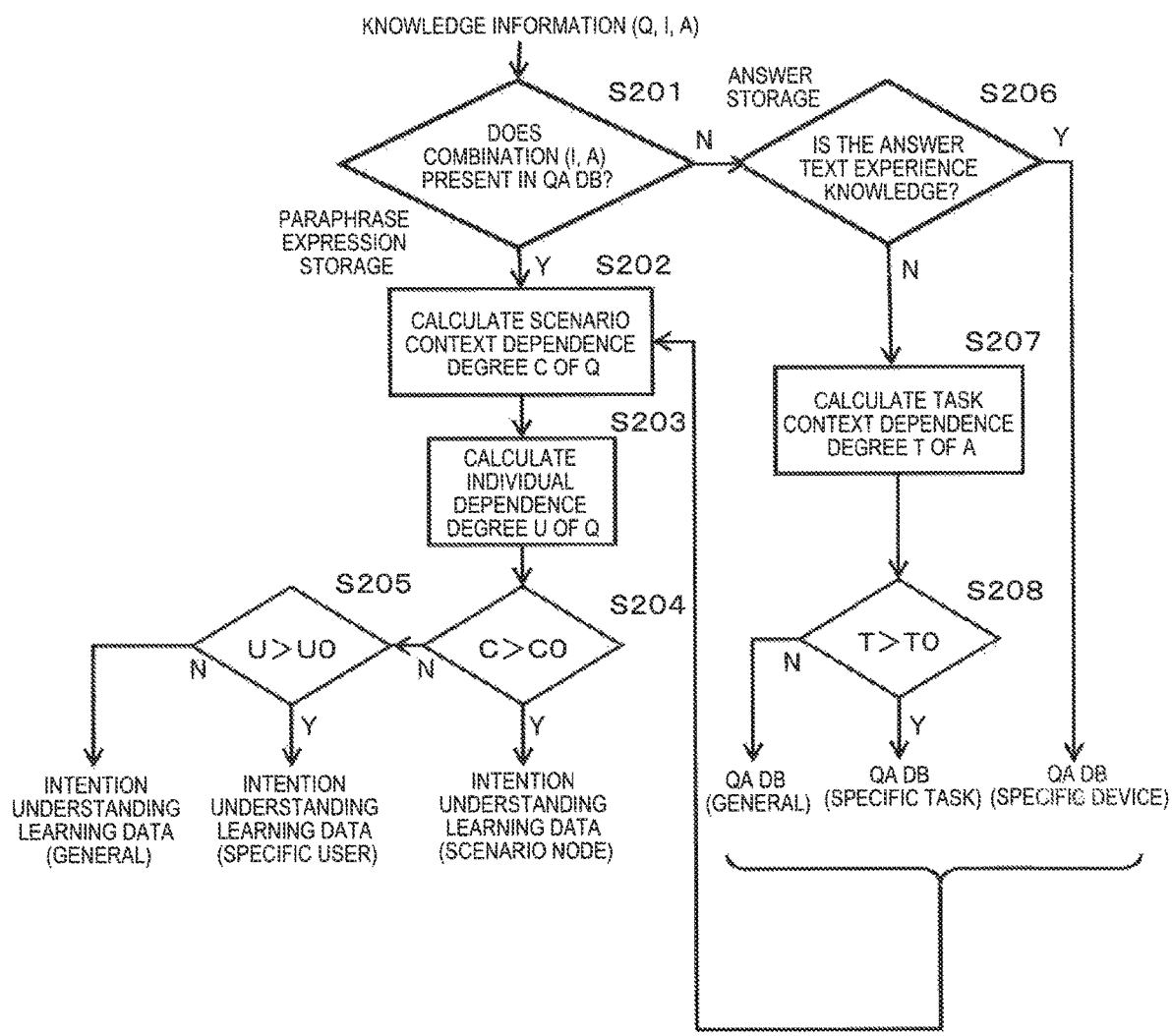
FIG. 11 is a flowchart illustrating a knowledge classification process according to the second embodiment.

Hereinafter, a second embodiment of the invention will be described with reference to FIGS. 9 to 11.

In the first Embodiment, knowledge acquisition of the learning-type interactive device which interacts with a user by voice recognition is described. In the embodiment, in addition to those described above, knowledge acquisition in a case where image recognition is possible for a person, operation logs are accumulated, and experience knowledge about a specific task is accumulated will be described.

In the embodiment, points different from the first embodiment will be mainly described.

First, the configuration of a learning-type interactive device according to the second embodiment will be described with reference to FIG. 9.

The learning-type interactive device of the embodiment is different from the learning-type interactive device of the first embodiment in that it has an image input unit 240 to which a camera (imaging device) 242 is connected and can capture moving images and still images shot from the camera 242.

In addition to those of the first embodiment, subcomponents of an image recognition portion 250 and an experience knowledge generation portion 252 are added to the processing unit 210.

The image recognition portion 250 is a functional unit which performs pattern recognition of captured moving images and still images and reads features thereof. The experience knowledge generation portion 252 is a functional unit which generates experience knowledge about the learning-type interactive device from the image recognition result of the image recognition portion 250 and the operation log. The experience knowledge about the learning-type interactive device is knowledge obtained by operating the learning-type interactive device.

In addition to the data of the first embodiment, the storage unit 220 includes a QA DB (specific device) 114 and an operation log 117.

The QA DB (specific device) 114 is created for each specific device and is data which stores an answer according to the contents of the question-answering on the specific device. Here, the specific device means the hardware of the learning-type interactive device and it is assumed that one learning-type interactive device is regarded as a specific device. The operation log 117 is an operation record of the learning-type interactive device. In the operation log 117, for example, a record such that a specific user who is image-recognized by the learning-type interactive device has talked about a certain topic with this device in which year, in which month, and in which day is wrote.

Next, the processes of the learning-type interactive device of the embodiment will be described with reference to FIGS. 10 and 11.

Figure 5:
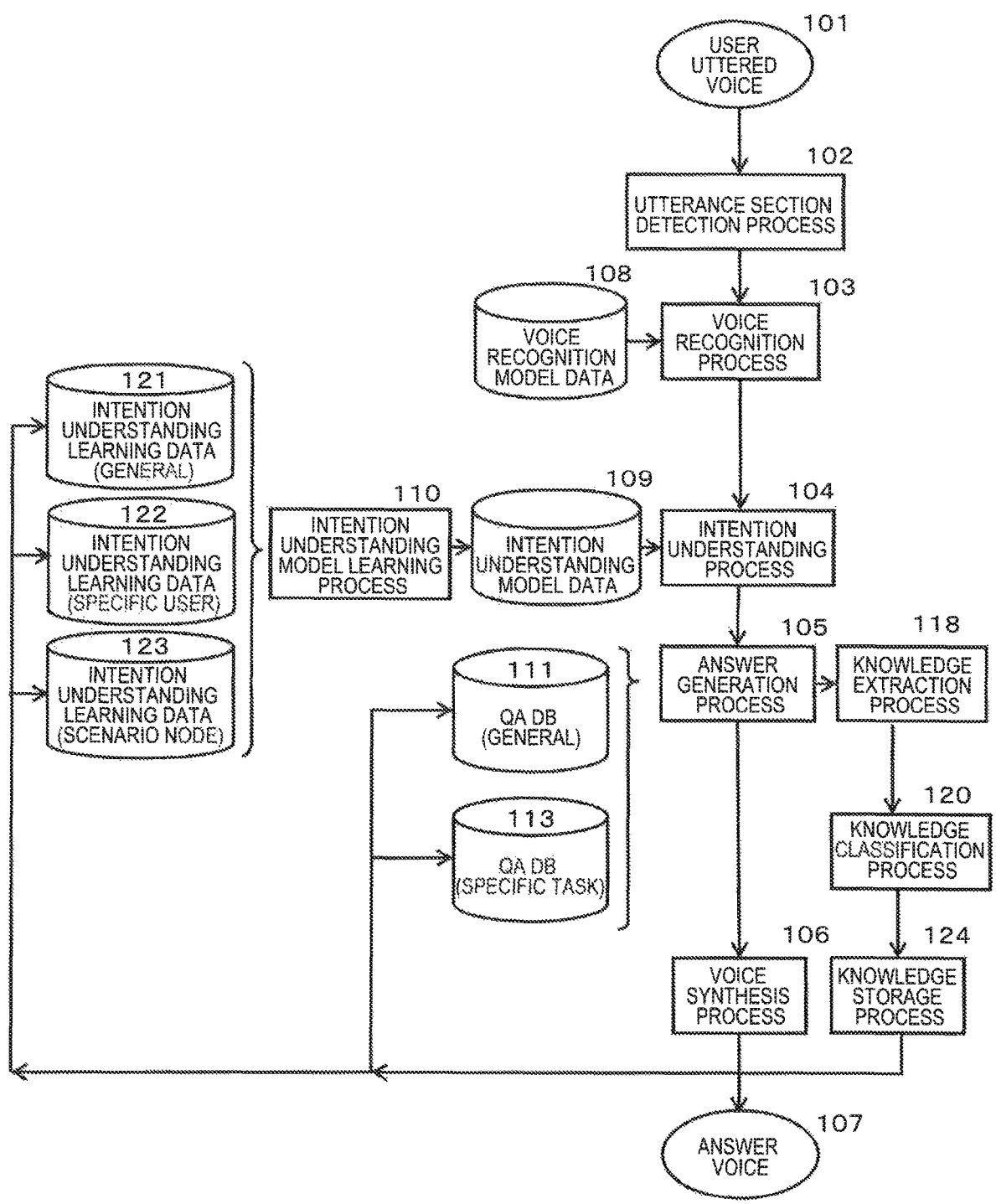
FIG. 5 is a flowchart illustrating a flow of a process of the learning-type interactive device according to the first embodiment.

In the learning-type interactive device of the embodiment, in the process of the learning-type interactive device illustrated in FIG. 5 of the first embodiment, an image recognition process 116 and an experience knowledge generation process 119 are added and the operation log 117 and QA DB (specific device) are added as data. In the learning-type interactive device of the embodiment, based on the result of image recognition and the operation log 117 of the learning-type interactive device, experience knowledge on the learning-type interactive device is generated by the experience knowledge generation process 119.

The generated experience knowledge is used in the determination of the knowledge classification process 120.

Next, the details of the knowledge classification process 120 according to the second embodiment will be described with reference to FIG. 11.

In the knowledge classification process 120 according to the second embodiment, as a determination process at S201: N, it is determined whether the answer text A is experience knowledge (S206). When the answer text A is experience knowledge (S206: Y), the acquired answer knowledge (I, A) is stored in the QA DB (specific device) 114. When the answer text A is not the experience knowledge (S206: N), the process proceeds to S207.

Figure 6:
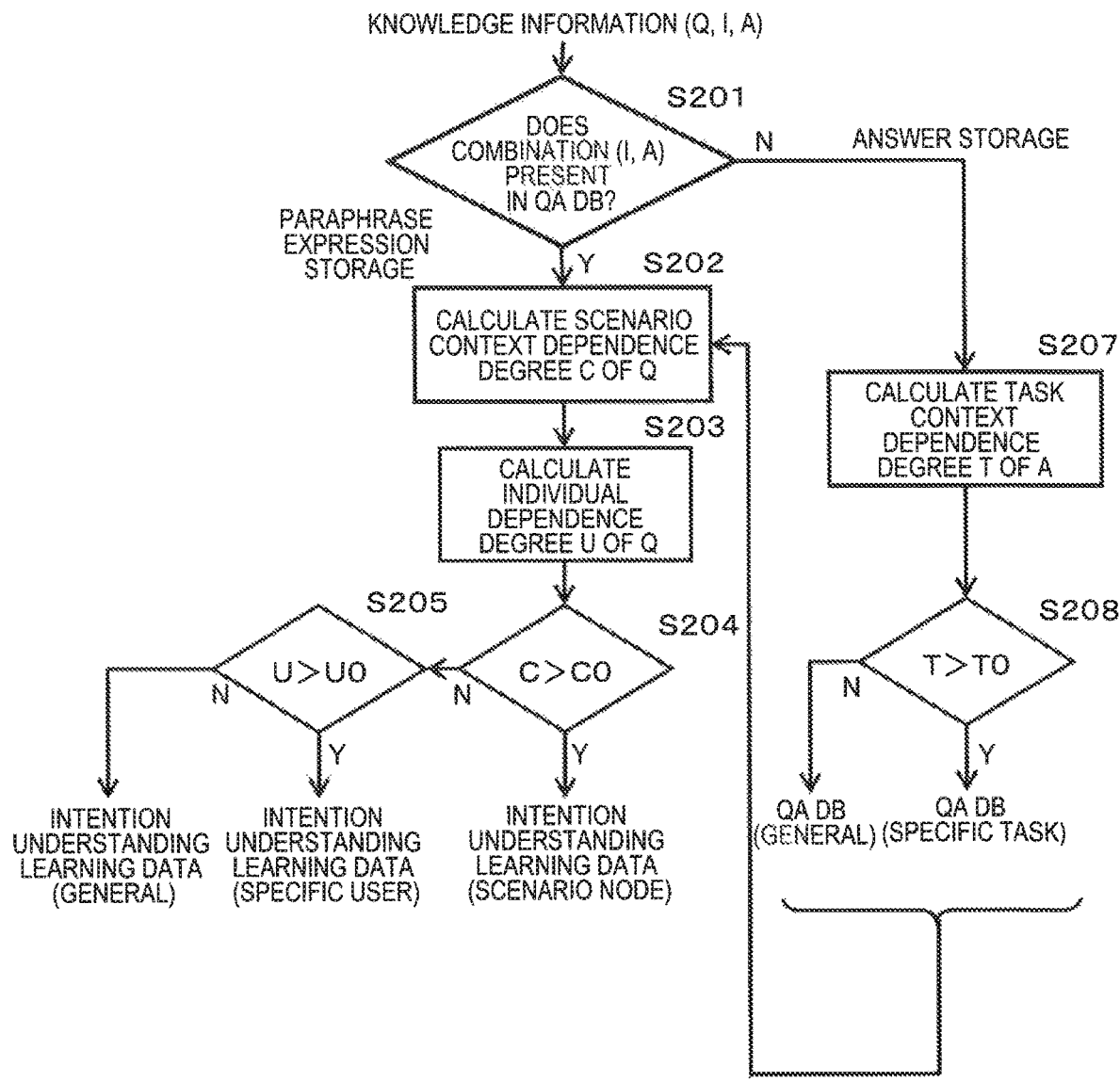
FIG. 6 is a flowchart illustrating a knowledge classification process according to the first embodiment.

Also, after the knowledge is stored in each QA DB, proceeding to the determination process of S202 is the same as the knowledge classification process 120 in the first embodiment illustrated in FIG. 6.

In the embodiment, in addition to the function of the learning-type interactive device of the first embodiment, it is possible to acquire knowledge specialized for a specific device.

What is claimed is:

1. A learning-type interactive device which performs voice dialogue with a user and accumulates a result of the voice dialogue as knowledge, the device comprising:
   a voice recognition portion which performs voice recognition on an acquired uttered voice of the user and converts the voice into text;
   an intention understanding portion which analyzes an utterance intention from the text voice-recognized by the voice recognition portion with reference to intention understanding model data learned from intention understanding learning data, wherein the intention understanding model data includes a text field for storing a word string of the text obtained from the intention understanding learning data, a command field for storing a command for the learning-type interactive device to operate, and a certainty factor field for storing a probability quantified between 0 and 1 in which the learning-type interactive device corresponds to the command described in the command field when the word of the text field comes out in dialogue;
   an answer generation portion which refers to a question and answer database (QA DB) and generates an answer text from the utterance intention analyzed by the intention understanding portion, wherein the question and answer database comprises a general portion and a specific task portion, the general portion configured to store a plurality of general purpose information and the specific task portion configured to store a plurality of specific task information;
   a knowledge extraction portion which extracts intention understanding learning data from the text voice-recognized by the voice recognition portion, the utterance intention, and the answer text, wherein the intention understanding learning data is classified by a scenario context dependence degree describing a dependence on a scenario of the voice dialogue and the scenario context dependence degree is calculated by generating a random word string having the same length as the word string of the text obtained from the intention understanding model data; and
   a knowledge classification portion which classifies the knowledge extracted by the knowledge extraction portion according to characteristics.

2. The learning-type interactive device according to claim 1, wherein
   the intention understanding learning data which is information of a pair of the text voice-recognized by the voice recognition portion and the utterance intention, or a question and answer database (QA DB) which is information of a pair of the utterance intention and the answer text.

3. The learning-type interactive device according to claim 2, wherein
   the intention understanding learning data is classified by an indicator as to whether the text voice-recognized by the voice recognition portion depends on a specific user.

4. The learning-type interactive device according to claim 2, wherein
   the QA DB is classified by an indicator as to whether the answer text depends on a specific task.

5. The learning-type interactive device according to claim 2, further comprising:
a unit which displays a result of classification of the knowledge of the knowledge classification portion and inputs determination of success or failure.

6. The learning-type interactive device according to claim 1, further comprising:
an image recognition portion which performs image recognition on a captured image.

7. The learning-type interactive device according to claim 1, wherein
an operation log is held.

8. The learning-type interactive device according to claim 7, further comprising:
an experience knowledge generation portion which generates experience knowledge related to the device from the operation log.

9. The learning-type interactive device according to claim 7, wherein
the QA DB is classified by an indicator as to whether the answer text depends on a specific device with reference to the operation log.

* * * * *